United States Patent
Dibble et al.

(10) Patent No.: US 6,269,625 B1
(45) Date of Patent: Aug. 7, 2001

(54) METHODS AND APPARATUS FOR IGNITING A CATALYTIC CONVERTER IN A GAS TURBINE SYSTEM

(75) Inventors: Robert W. Dibble, Livermore; Rajiv K. Mongia, Alameda, both of CA (US)

(73) Assignee: Solo Energy Corporation, Alameda, CA (US)

( * ) Notice: Subject to any disclaimer, the term of this patent is extended or adjusted under 35 U.S.C. 154(b) by 0 days.

(21) Appl. No.: 09/398,212

(22) Filed: Sep. 17, 1999

(51) Int. Cl.[7] .............................. F02C 7/26; F02B 43/00
(52) U.S. Cl. .................... 60/39.06; 60/39.12; 60/39.142; 60/723
(58) Field of Search ............................. 60/39.06, 39.142, 60/39.12, 223

(56) References Cited

U.S. PATENT DOCUMENTS

| | | | |
|---|---|---|---|
| 3,846,979 | * 11/1974 | Pfefferle | 60/39.04 |
| 4,112,675 | * 9/1978 | Pillsbury et al. | 60/39.06 |
| 4,754,607 | 7/1988 | MacKay . | |
| 5,946,917 | * 9/1999 | Hums et al. | 60/723 |
| 6,109,018 | * 8/2000 | Rostrup-Nielson et al. | 60/39.06 |

OTHER PUBLICATIONS

Article: EPA, Proceedings Fourth Workshop on Catalytic Combustion, "Fuel Injector, Ignition, and Temperature Measurement Techniques for Catalytic Combustors", S.J. Anderson et al. (May 1980) pp. 1–34.

* cited by examiner

Primary Examiner—Charles G. Freay
(74) Attorney, Agent, or Firm—Burns, Doane, Swecker & Mathis. L.L.P.

(57) ABSTRACT

An energy producing system includes a compressor side for compressing an air/fuel mixture, and a turbine side for producing mechanical, electrical, and/or heat energy, and driving the compressor side. A catalytic combustor is disposed upstream of the turbine side for combusting a steady state air/fuel mixture during a steady state operation of the apparatus. During start-up of the system, the catalytic combustor is preheated by being supplied with a preheat air/fuel mixture capable of lighting-off therein at ambient temperature, whereby oxidization of the preheat air/fuel mixture in the catalytic combustor produces heat. The preheat air/fuel mixture is produced on-site, preferably in a reformer which burns natural gas in the presence of insufficient oxygen for complete combustion, thereby producing hydrogen and carbon monoxide.

22 Claims, 2 Drawing Sheets

METHODS AND APPARATUS FOR IGNITING A CATALYTIC CONVERTER IN A GAS TURBINE SYSTEM

BACKGROUND OF THE INVENTION

The present invention relates to a gas turbine of the type in which an air/fuel mixture is reacted in a catalytic combustor.

Gas turbine systems have been previously proposed in which an air/fuel mixture is compressed by a compressor, and then reacted in a catalytic combustor. For example, U.S. Pat. No. 4,754,607 describes a self-contained energy center or cogeneration system which converts chemical energy into mechanical, electrical, and heat energy. The fuel, preferably a gaseous fuel such as natural gas, is mixed with air in a mixer, and then the mixture enters the compressor. The compressor compresses the air/fuel mixture and outputs the compressed mixture to the cold side of a heat exchanger in which the mixture becomes heated. The heated, high-pressure mixture is then delivered to the combustion chamber of a catalytic combustor. The resulting products of combustion are directed to the inlet of an expansion turbine mounted on the compressor shaft. After powering the turbine, the hot combustion gases are directed through the hot side of the heat exchanger, whereupon those gases supply the heat which is transferred to the cooler air/fuel mixture passing through the cold side of the heat exchanger. The still-hot combustion gases exiting the hot side of the heat exchanger are delivered to heat-utilizing devices such as a hot water heater. Meanwhile, the turbine drives an electric generator mounted on the compressor shaft for producing electric power.

During start-up of the system, the combustion chamber of the catalytic combustor is too cold to combust the particular air/fuel mixture used during steady state operation (e.g., natural gas). Therefore, there is provided a separate preheat burner disposed in the conduit which connects the outlet of the turbine to the hot side of the heat exchanger. The preheat burner is supplied with fuel to create combustion gases. Those gases are then supplied to the hot side of the heat exchanger for preheating the air delivered to the cold side of the heat exchanger from the compressor (which is being motored-over during start-up). The air preheated in the cold side of the heat exchanger is then conducted through the catalytic combustor to heat the latter. Once the catalytic combustor has been sufficiently heated to support combustion of the steady-state air/fuel mixture, the preheat burner is deactivated, and the steady state air/fuel mixture is fed to the compressor.

The above-described system exhibits certain shortcomings, especially as regards the start-up or pre-heating operation. In that regard, the start-up procedure requires that heat be transferred from preheated air to cold air traveling through a heat exchanger, and a subsequent transfer of that heat from the air to the catalytic combustor. Due to the temperature limits of the materials in the heat exchanger, and the mass of the heat exchanger which must be heated, that procedure is highly time consuming, requiring that the high energy-consuming starter motor be driven for a relatively long period, e.g., two minutes or longer, thereby considerably reducing the efficiency of the system.

It has also been proposed to provide a pre-heat burner upstream of the catalytic combustor. However, that arrangement involves a number of shortcomings. Firstly, the arrangement is inefficient, because it requires that all of the air or air/fuel mixture must be heated to the light-off temperature. Secondly, the transition from the pre-heat state to the steady state is difficult, since the pre-heat burner includes an open flame, and the ignition of the steady state air/fuel mixture may flash back into the pre-burner, causing the pre-heat burner or the catalyst to overheat.

In addition, if the pre-burner fails to light immediately, locally high concentrations of fuel may be introduced into the catalyst, which can cause overheating when the pre-burner thereafter ignites.

Finally, if the pre burner is positioned in the main flow it may fail and damage the catalyst and introduces parasitic pressure losses in other modes than start-up. If it is placed outside the main flow, complicated and costly valving must be supplied to direct the flow through the pre-burner during start-up and through the catalyst in all other operating modes.

Placing the pre-heat burner downstream of the catalytic combustor solves some of the above mentioned problems, but still requires that the gaseous fuel be compressed separately, or that an alternative fuel be used for start-up. Also, if a downstream burner is placed in the main flow from the catalytic combustor, it must withstand the high temperatures exiting therefrom in operating modes other than start-up, which increases the problem of failure and damages to the turbine and also introduces parasitic pressure losses, decreasing efficiency. If such a burner is not placed in the main flow, complicated valving must be provided to direct the flow through it during start-up, and isolate it during other modes of operation.

Many techniques for achieving light-off have also been proposed in "Fuel Injector, Ignition, and Temperature Measurement Techniques for Catalytic Combustors," Proceedings Fourth Workshop on Catalytic Combustion Cincinnati, Ohio, May 1980. Most of these methods consist of placing an ignition source upstream of the catalyst, which has the risk of overheating local areas, which can lead to premature failure of the catalyst or the substrate due to overheating and/or thermal shock. Others of the methods involve electrical resistance heating of the combustor air, which requires very large quantities of electrical energy, leading to impractically large and costly batteries when grid power is not available. Also discussed is the introduction of hydrogen of the catalyst, by direct injection or by releasing hydrogen, trapped as a hydride, by electrolytically heating a structure placed upstream of the catalyst. However, the hydride storage structure has the disadvantage that parts of the structure may separate and move downstream into the catalyst, blocking portions thereof and leading to failure or excessive emissions. Direct injection of hydrogen is proposed, but dismissed because it is "dangerous, difficult to handle," and "unattractive to potential users". To this should be added the fact that storing sufficiently large quantities of hydrogen for prolonged operation is both costly and perceived as dangerous. Further, if the hydrogen is not produced or stored at sufficient pressure for injection, it would be necessary to provide a gas compressor for generating such pressure which is expensive and dangerous.

Therefore, it would be desirable to provide a safe, simple, and economic way of pre-heating a catalytic combustor and which does so more quickly than reliance on a heat exchanger.

It would also be desirable to provide such a pre-heating technique which does not depend on thermal energy from a burner upstream or downstream of the catalyst, and which overcomes the difficulties associated with direct hydrogen injection.

SUMMARY OF THE INVENTION

A method aspect of the present invention relates to a method of preheating a catalytic combustor disposed upstream of an expansion turbine, the catalytic combustor being at ambient temperature. The method comprises the steps of:

A. rotating the turbine;

B. providing a medium which is treatable to produce a preheat fuel which when mixed with air forms a preheat air/fuel mixture capable of lighting-off at ambient temperature in the catalytic combustor;

C. treating the medium to produce the preheat fuel (and, if necessary, conditioning the pre-heat fuel to achieve physical temperatures required by the system materials); immediately thereafter D. mixing the fuel with air to produce the pre-heat air/fuel mixture which is delivered to, and oxidized in, the catalytic combustor, to produce heat; and E. replacing the preheat air/fuel mixture with a steady-state air/fuel mixture having a higher light-off temperature than the preheat air/fuel mixture, once the catalytic combustor has been heated to the light-off temperature of the steady state air/fuel mixture.

Preferably, the preheat air/fuel mixture is produced by burning natural gas in a reformer in the presence of insufficient oxygen for complete combustion, thereby producing hydrogen and carbon monoxide, which is immediately mixed with air.

An apparatus according to the invention comprises a compressor side for compressing an air/fuel mixture, and a turbine side for driving the compressor side. A source of steady state fuel is connected to an inlet of the compressor side. The steady state fuel, when mixed with air, has a first light-off temperature. A catalytic combustor is arranged to receive and combust compressed steady state air/fuel mixture from the compressor and to supply the resulting products of combustion to the turbine. There is provided a device for producing preheat fuel which, when mixed with air, has a second light-off temperature lower than the first light-off temperature. Valving can be optionally provided for blocking the supply of steady-state fuel, and supplying only preheat fuel or a mixture of preheat fuel and steady-state fuel, during start-up of the apparatus.

The preheat fuel could be introduced to the compressor inlet side or it could be pressurized separately and then introduced between the compressor exit side and the catalytic combustor.

Preferably, the device for producing the preheat fuel comprises a reformer for converting natural gas fuel into hydrogen and carbon monoxide. The preferred reformer is a burner for combusting natural gas in the presence of insufficient oxygen for complete combustion, thereby producing hydrogen and carbon monoxide which is mixed with air to form the preheat fuel.

The invention also pertains to a method of operating an energy producing system employing a compressor side, a turbine side for driving the compressor side, and a catalytic combustor arranged to receive and combust compressed air/fuel mixture and supply resulting products of combustion to the turbine. The method comprises the steps of:

A) providing a first flow of fuel having a first light-off temperature;

B) removing some of the fuel from the first fuel flow;

C) treating the removed fuel to produce a second flow of fuel having a lower light-off temperature than the fuel of the first flow; and D) supplying the first and second fuel flows to the catalytic combustor along with air.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 1:
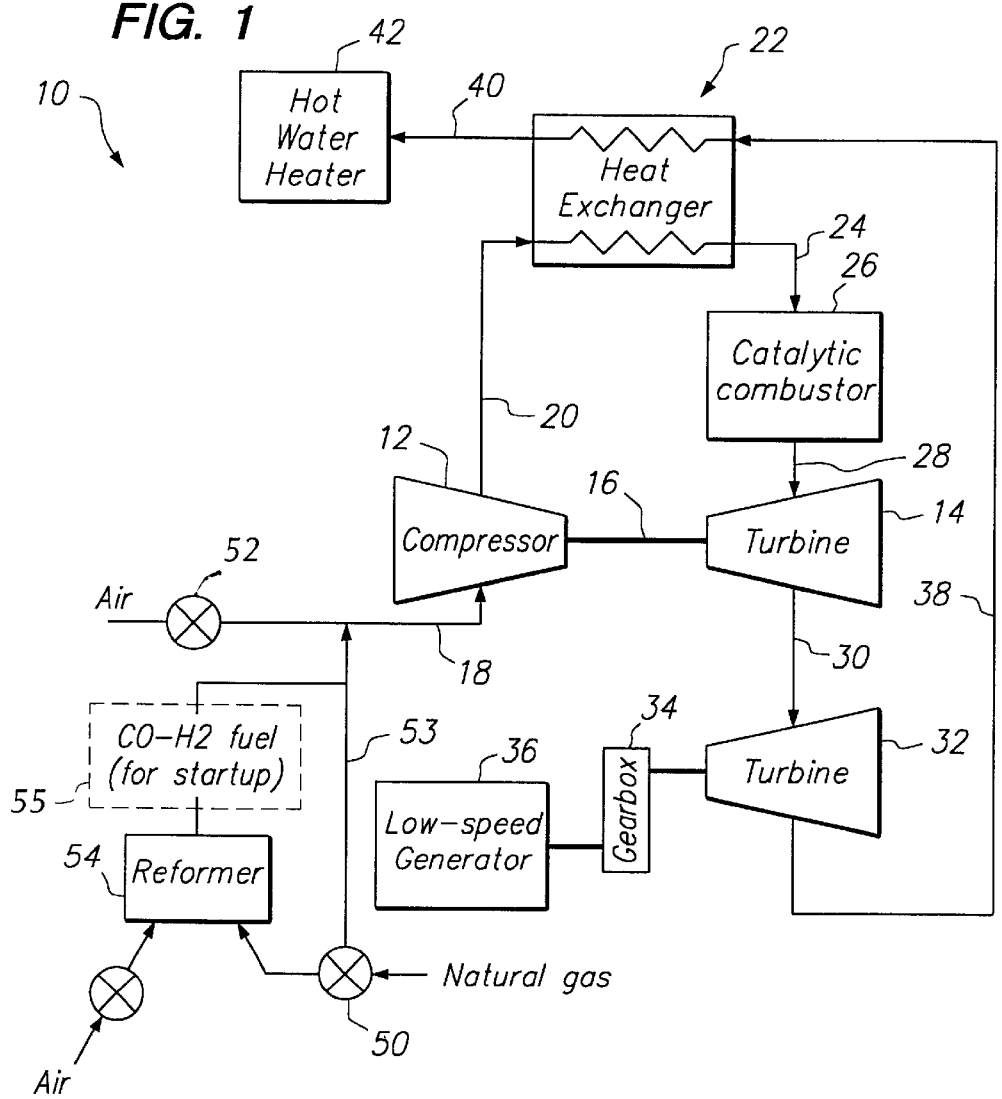
FIG. 1 is a schematic view of a gas turbine system according to a first embodiment of the invention.

A gas turbine system 10 depicted in FIG. 1 could be a cogeneration system of the type described in U.S. application Ser. No. 09/034,259, filed Mar. 4, 1998, now U.S. Pat. No. 6,107,693, (the disclosure of which being incorporated by reference herein) wherein chemical energy is converted into mechanical, electrical and/or heat energy. The compressor side includes a compressor 12, and the turbine side includes a main turbine 14 mounted on a common shaft 16, and a secondary turbine 32. During steady state operation, a steady state air/fuel mixture is aspirated into the compressor inlet via conduit 18, due to the low pressure at that inlet. Alternatively, the air and fuel could be supplied separately to the compressor and mixed therein.

The air/fuel mixture is compressed in the compressor and then conducted via conduit 20 to the cold side of a heat exchanger 22, preferably a recuperator type of heat exchanger, although any suitable type of heat exchanger could be used, such as a regenerator type of heat exchanger as disclosed in U.S. application Ser. No. 09/034,394, filed Mar. 4, 1998. As it passes through the heat exchanger, the compressed air/fuel mixture is heated and then conducted to a catalytic combustor 26 via conduit 24. The catalytic combustor comprises a conventional catalytic combustor employing, for example, palladium or platinum as a catalyst.

The warm, compressed air/fuel mixture is combusted in the catalytic combustor, and the resulting products of combustion are directed via conduit 28 to the inlet of the main expansion turbine 14. After powering that turbine, the gases are delivered via conduit 30 to the secondary expansion turbine 32 to drive that turbine 32. The turbine 32 drives a gearbox 34 which, in turn, can drive one or more mechanical devices, such as a generator 36 for producing electrical energy. After powering the turbine 32, the gases are conducted via conduit 38 through the hot side of the heat exchanger 22 to supply the heat which is transferred to the earlier-mentioned cooler air/fuel mixture passing through the cold side of the heat exchanger 22. The hot gases exiting the warm side of the heat exchanger 22 are delivered via conduit 40 to one or more heat-utilizing devices such as a hot water heater 42.

It is necessary for the catalytic combustor to be at a temperature at least equal to the light-off temperature for the steady-state air/fuel mixture, i.e., usually about 450° C., in order for steady state operation to occur. As explained earlier herein, during start-up of the system, it is necessary to heat the catalytic converter to that light-off temperature, and this has previously been accomplished by means of a burner device located upstream or downstream of the catalytic combustor or downstream of the turbine(s). Disadvantages of both of those techniques have been discussed earlier herein.

The present invention eliminates those disadvantages in that rather than supplying physical heat to the catalyst, the catalyst is supplied with a pre-heat fuel having high chemical energy that is capable of lighting-off at ambient temperature. Such a fuel, preferably hydrogen, oxidizes in, and only in, the catalytic combustor to produce heat and rapidly heat the catalytic combustor. Importantly, the preheat fuel is produced on-site, thereby avoiding the need for storage and the attendant hazards.

In a first preferred embodiment of the invention, depicted in FIG. 1, natural gas is supplied to a first valve 50. During steady-state operation, the first valve 50 supplies the natural gas directly to the conduit 18. Thus, natural gas constitutes the preferred steady-state fuel.

On the other hand, during start-up, the first valve 50 directs the natural gas to a conventional reformer 54 which could be simply a burner which burns the natural gas in the presence of insufficient oxygen for complete combustion. The resulting products of combustion are hydrogen ($H_2$) and carbon monoxide (CO) which are then conditioned, if necessary, by removing heat to meet the temperature requirements of the compressor blades, which, in typical commercial turbochargers are made of a material such as aluminum (for low cost and ease of manufacture), which typically has a low upper temperature limit. Then, the products of combustion are immediately supplied to the conduit 18 and mixed with air. The air, hydrogen and carbon monoxide are compressed in the compressor 12, and supplied to the catalytic combustor, which during start-up is at substantially ambient temperature. The compressed hydrogen and carbon monoxide are able to oxidize in the catalytic combustor at a temperature of 0° C. Such a temperature is well below ambient temperature for most parts of the world. Further, it will be appreciated by those skilled in the art that various means may be used to raise the temperature of the air entering the compressor to achieve a temperature of 0 (zero) degrees C. prior to the catalyst for operation in extreme Arctic conditions. For example, any heat obtained by conditioning the start-up fuel exiting the reformer 54 could be so used. Other well known heating means include: steam heating and use of an auxiliary heater. Upon oxidizing, the hydrogen and carbon monoxide will produce heat which rapidly raises the temperature of the catalytic combustor. When the catalytic combustor reaches a temperature equal to the light-off temperature of the steady state air/fuel mixture (i.e., air and natural gas), the valve 50 is adjusted to redirect the natural gas away from the reformer and into the conduit 18, whereby steady-state operation is achieved.

Importantly, the preheat fuel is produced on site, i.e., in the reformer, so it is unnecessary to store the highly flammable preheat fuel. Stored hydrogen, for example, would have to be kept under pressure or compression, for safety reasons. No such precautions are needed in the present invention since the hydrogen is used immediately after being produced.

It will be appreciated that the invention envisions the use of any pre-heat fuel having a suitably low light-off temperature so that it will light-off at most ambient temperatures. While hydrogen is preferred, hydrogen plus carbon monoxide is satisfactory.

Other ways of producing the pre-heat fuel include hydrolysis, suitable chemical reactions, processes using steam reforming of methane or other feed stocks, or through the use of rich burn catalysts (see "Fuel Rich Catalytic Reaction Experimental Results", 27th Joint Propulsion Conference, Sacramento, Calif., Jun. 24–27, 1991).

Another advantage of the arrangement described in connection with FIG. 1 occurs in the event that, over time, the catalyst surface will degrade so that the catalytic combustor would have to be at a higher inlet temperature in order to maintain efficient combustion of the steady-state fuel. In that event, the valve 50 can be adjusted to direct some natural gas to the reformer 54, and the valve 52 adjusted to admit to the conduit 18 a mixture of: (i) $H_2$ and CO from the reformer 54, and (ii) natural gas from the conduit 53. The $H_2$ and CO in the air/fuel mixture will ignite and combust completely even on the degraded catalyst surface which will serve to raise the temperature of the catalyst surface, enabling the catalytic combustor to operate at or near normal efficiency.

It may be desirable to employ, between the reformer 54 and the valve 52, a mechanism such as a conventional watershift reactor 55 which converts some of the CO—$H_2$ received from the reformer, into $CO_2$—H2, producing a final mixture richer in H2 which will light-off at a lower temperature than the original CO—H2 mixture. Also, a conventional CO sponge could be provided to remove, temporarily, CO from the stream to create a H2 rich stream.

It may also be necessary to cool the pre-heat fuel produced by the reformer, depending upon the level of heat-resistance exhibited by the compressor blades. For example, aluminum compressor blades could be damaged by the hot pre-heat fuel, thereby requiring that the pre-heat fuel be cooled prior to entering the compressor. Alternatively, the preheat fuel could be introduced between the compressor and the catalytic combustor. Of course, then a pressurizing device would be needed to separately pressurize the preheat fuel, because the pre-heat fuel must be forced into the pressurized air stream discharged from the compressor.

Figure 2:
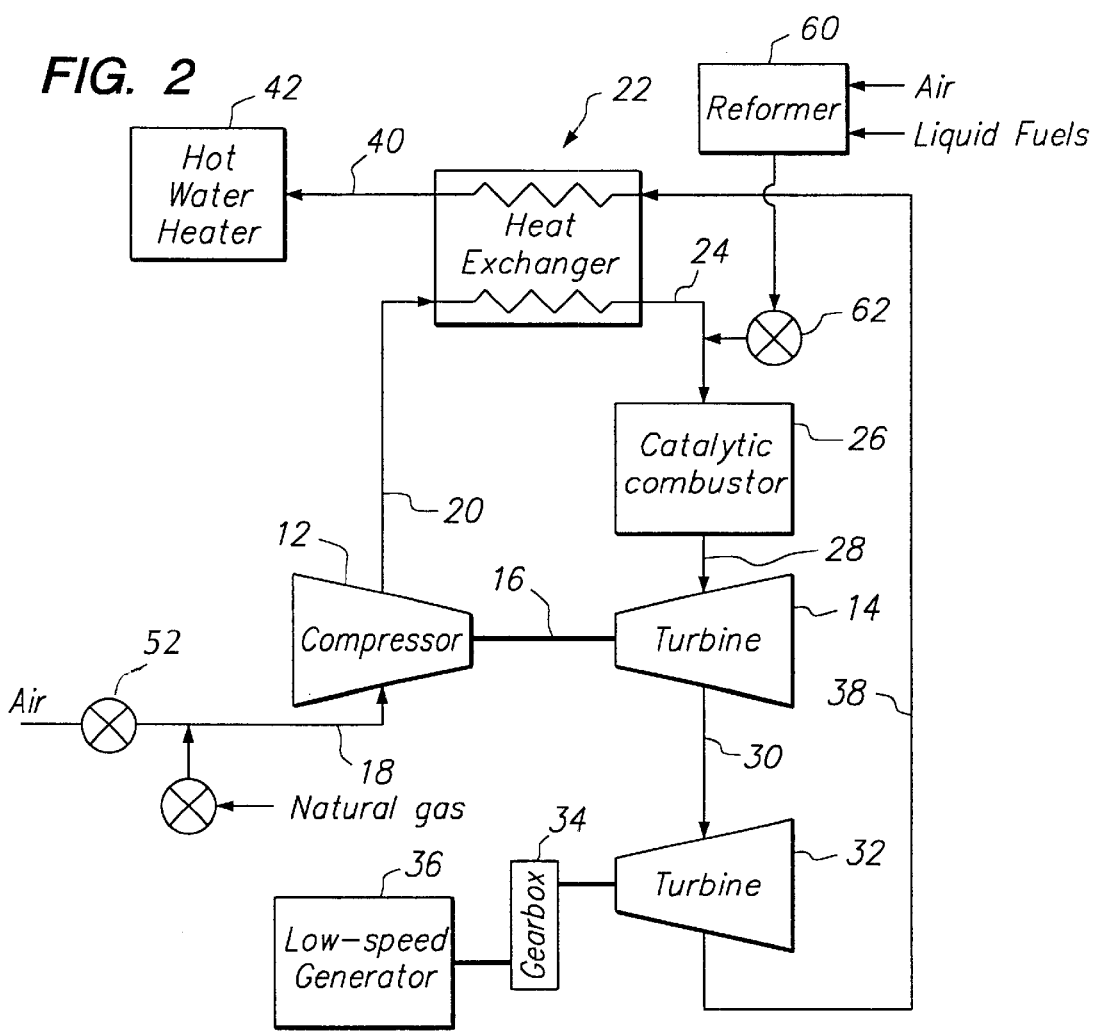
FIG. 2 is a view similar to FIG. 1 of a second preferred embodiment of the invention.

The possibility of providing a pressurizing device for introducing the pre-heat fuel at a location between the compressor outlet and the catalytic combustor gives rise to another embodiment of the invention depicted in FIG. 2. In that embodiment, liquid fuel is employed in lieu of natural gas for creating a preheat fuel. The liquid fuel is delivered to a reformer 60 under pressure and combusted therein to produce $H_2$ and CO which are also under pressure. The pressurized $H_2$ and CO are fed to the catalytic combustor via valve 62. Because the energy required to pressurize the liquid fuel is much less than that needed to pressurize the resulting gaseous products, the process will be more efficient. Importantly, this use of liquid fuel would provide a means of operating the system to supply at least partial, and possibly full, power during situations such as natural disasters when natural gas supply by pipeline may be interrupted.

Figure 3:
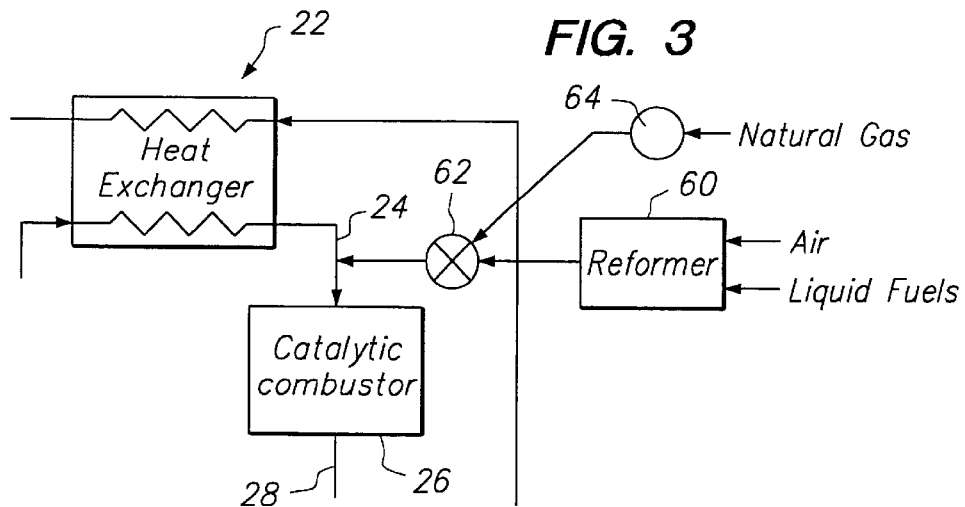
FIGS. 3 and 4 are views depicting respective alternative ways of supplying fuel to the catalytic combustor.

Although in the above-described embodiments the steady-state fuel has been introduced into the compressor 12, it could instead be introduced into the catalytic combustor 26. For example, as shown in FIG. 3, the steady-state fuel comprises natural gas that is compressed in a compressor 64 and supplied to the valve 62.

Figure 4:
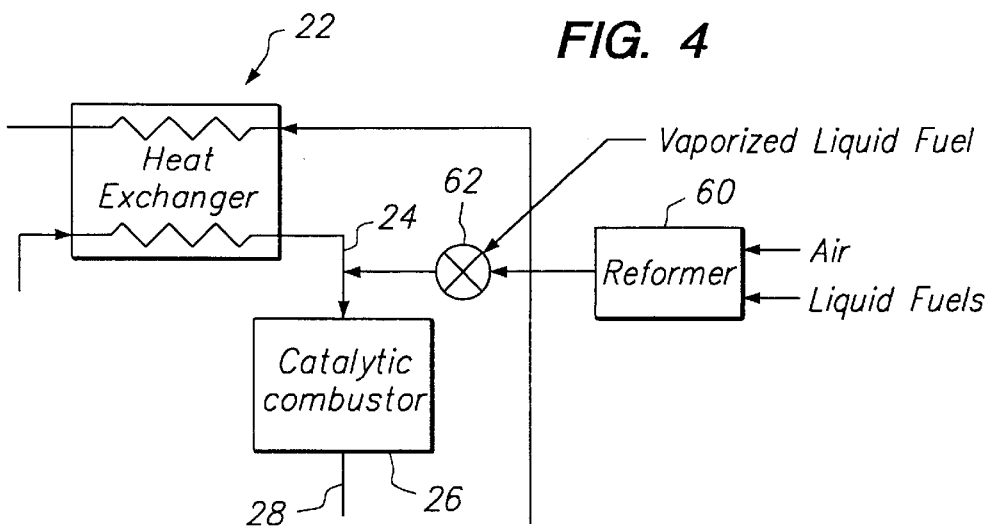

Alternatively, as shown in FIG. 4, the steady-state fuel could be in the form of vaporized liquid supplied to the valve 62.

It will be appreciated that the present invention provides a safe, simple, rapid and economical way of raising the temperature of a catalytic combustor during start-up.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of preheating a catalytic combustor disposed upstream of an expansion turbine, the catalytic combustor being at ambient temperature, the method comprising the steps of:

A) rotating the turbine;
   B) providing a medium treatable to produce a preheat fuel which when mixed with air forms a preheat air/fuel mixture capable of lighting-off at ambient temperature in the catalytic combustor;
   C) treating the medium to produce the preheat fuel; immediately thereafter
   D) mixing the fuel with air to produce the pre-heat air/fuel mixture which is delivered to, and oxidized in, the catalytic combustor, to produce heat; and
   E) replacing the pre-heat air/fuel mixture with a steady-state air/fuel mixture having a higher light-off temperature than the pre-heat air/fuel mixture, when the catalytic combustor has been heated to the light-off temperature of the steady-state air/fuel mixture.

2. The method according to claim 1 further including the step of compressing the pre-heat air/fuel mixture in a compressor, whereby the catalytic combustor receives the pre-heat air/fuel mixture in a compressed state.

3. The method according to claim 2 further including the step of transmitting energy from the turbine to drive the compressor.

4. The method according to claim 1 wherein the pre-heat air/fuel mixture contains oxygen and gaseous hydrogen.

5. The method according to claim 4 wherein the pre-heat air/fuel mixture further contains carbon monoxide.

6. The method according to claim 5, wherein step C includes the step of reforming natural gas to produce the pre-heat fuel containing hydrogen and the carbon monoxide.

7. The method according to claim 6 wherein the reforming step comprises burning natural gas in a reformer in the presence of insufficient oxygen for complete combustion.

8. The method according to claim 1 wherein the pre-heat air/fuel mixture contains oxygen and gaseous hydrogen.

9. The method according to claim 4 wherein the pre-heat air/fuel mixture further contains carbon monoxide.

10. The method according to claim 9 wherein step C includes the step of reforming liquid fuel to produce the gaseous hydrogen and the carbon monoxide.

11. The method according to claim 10 wherein the reforming step comprises combusting a pressurized liquid in the presence of insufficient oxygen for producing complete combustion.

12. The method according to claim 1 wherein the turbine is mounted on a common shaft with a compressor, the pre-heat air/fuel mixture introduced at a location downstream of the compressor.

13. The method according to claim 12 wherein a heat exchanger is situated between the compressor and the catalytic combustor, the heat exchanger including a cold side having an inlet connected to the compressor, and an outlet connected to the catalytic combustor, the heat exchanger further including a hot side having an inlet for receiving turbine exhaust gases, the pressurized hydrogen and carbon monoxide being introduced downstream of the heat exchanger.

14. An energy producing apparatus comprising:
   a compressor side for compressing an air/fuel mixture;
   a turbine side for driving the compressor side;
   a source of steady-state fuel connected to an inlet of a compressor of the compressor side, the steady-state fuel when mixed with air having a first light-off temperature;
   a catalytic combustor arranged to receive and combust compressed steady-state air/fuel mixture from the compressor side and to supply resulting products of combustion to a turbine of the turbine side;
   producing means arranged to receive fuel and air and raise a temperature of the fuel in the presence of the air and in the absence of adding external heat for producing a pre-heat fuel which when mixed with air has a second light-off temperature lower than the first light-off temperature; and
   valving means for selectively supplying the pre-heat fuel/air flow, during start-up of the apparatus, to facilitate the start-up.

15. The apparatus according to claim 14 wherein the producing means is connected to the compressor side inlet.

16. The apparatus according to claim 14 wherein the producing means is connected between the compressor side and the catalytic combustor.

17. The apparatus according to claim 14 further including a heat exchanger having a cold side for receiving compressed steady-state fuel from the compressor side, and a hot side for receiving turbine exhaust gases, and a conduit for introducing the pre-heat fuel/air flow downstream of the heat exchanger.

18. The apparatus according to claim 14 wherein the producing means produces hydrogen.

19. The apparatus according to claim 14 wherein the fuel supplied to the producing means is natural gas, the producing means including a reformer for burning the natural gas in the presence of insufficient oxygen for complete combustion.

20. The apparatus according to claim 14 wherein the valving means is arranged for completely blocking-off the supply of steady-state fuel having the first light-off temperature while the pre-heat fuel is being supplied.

21. A method of operating an energy producing system employing a compressor side, a turbine side for driving the compressor side, and a catalytic combustor arranged to receive and combust compressed air/fuel mixture and supply resulting products of combustion to the turbine, the method comprising the steps of:

A) providing a first flow of fuel which in the presence of air has a first light-off temperature;
   B) removing some of the fuel from the first fuel flow;
   C) heating the removed fuel to produce a second flow of fuel which in the presence of air has a second light-off temperature lower than the first light-off temperature; and
   D) supplying the first and second fuel flows to the compressor side inlet along with air.

22. An energy producing apparatus comprising:
   a compressor side for compressing an air/fuel mixture;
   a turbine side for driving the compressor side;
   a source of stead-state fuel connected to an inlet of a compressor of the compressor side, the steady-state fuel when mixed with air having a first light-off temperature;
   a catalytic combustor arranged to receive and combust compressed steady-state air/fuel mixture from the compressor and to supply resulting products of combustion to a turbine of the turbine side;

producing means for producing pre-heat fuel which when mixed with air has a second light-off temperature lower than the first light-off temperature; and valving means for selectively supplying the pre-heat fuel to the compressor inlet side during start-up of the apparatus.

* * * * *